No. 695,113. Patented Mar. 11, 1902.
A. J. NORRIS.
ROTARY CUTTER.
(Application filed Nov. 11, 1901.)
(No Model.) 3 Sheets—Sheet 1.
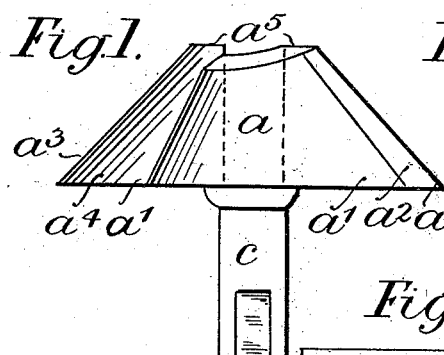
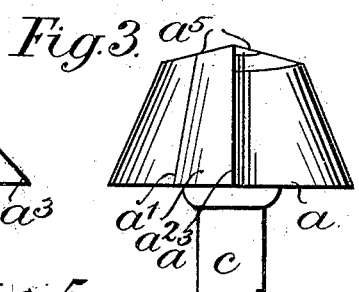
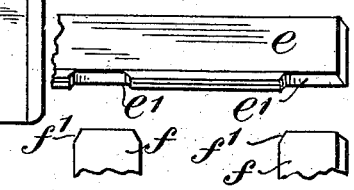
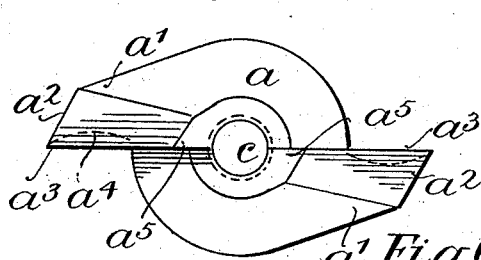
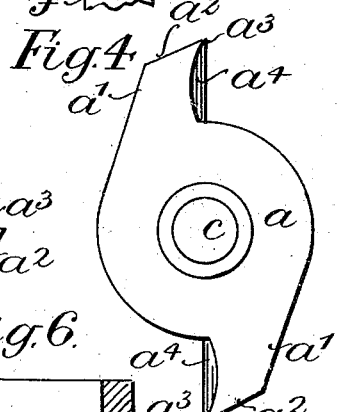
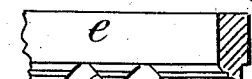
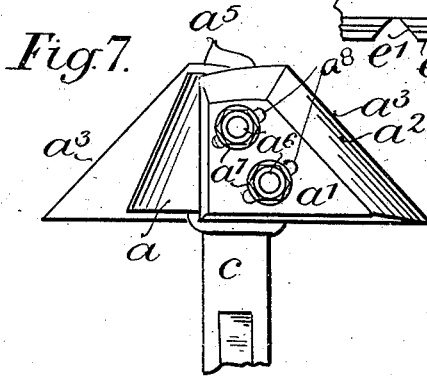
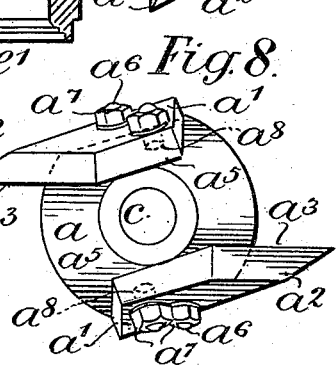
Witnesses:
Katherine E. Manning.
Inventor:
Arthur James Norris
By Knight Bros
attys

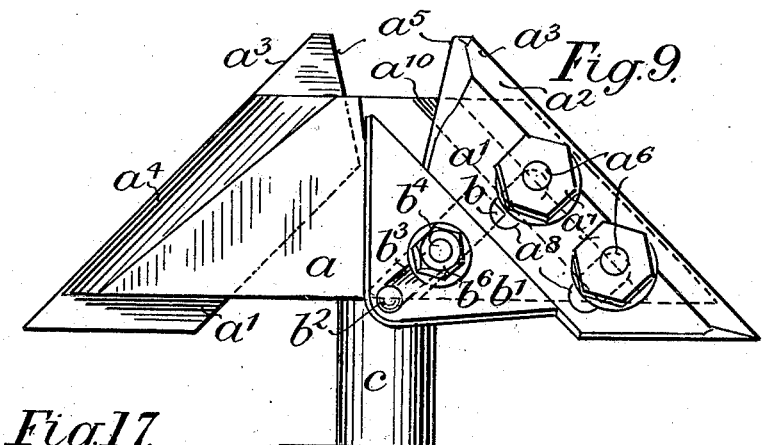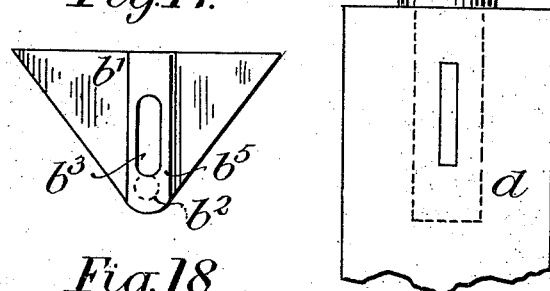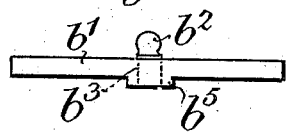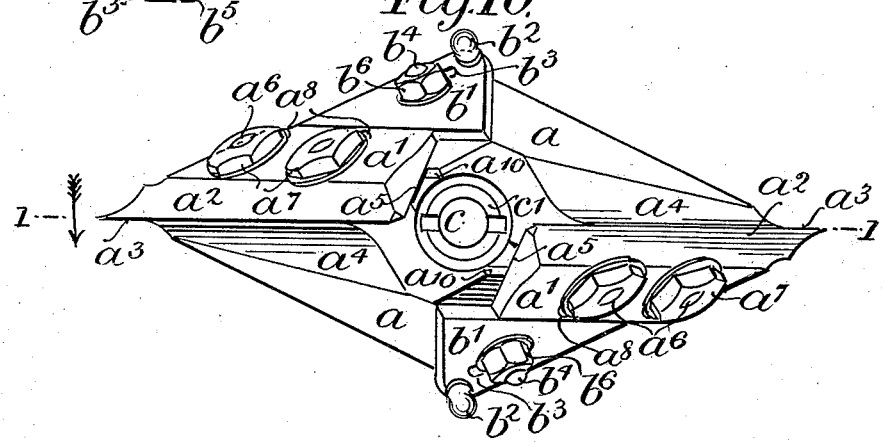

No. 695,113. Patented Mar. 11, 1902.
A. J. NORRIS.
ROTARY CUTTER.
(Application filed Nov. 11, 1901.)
(No Model.) 3 Sheets—Sheet 3.
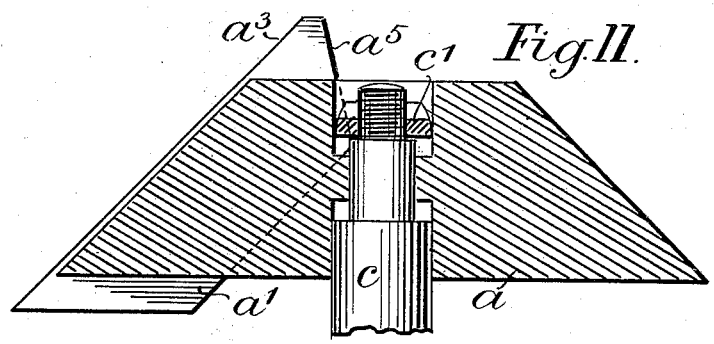
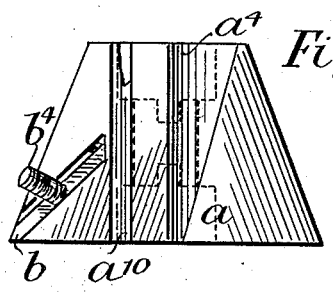
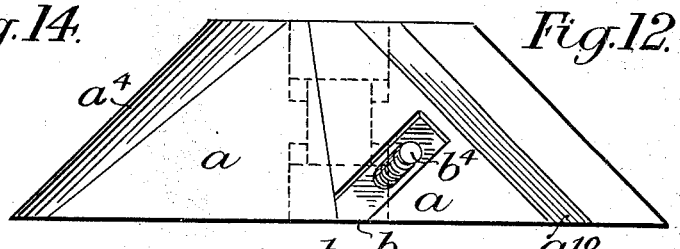
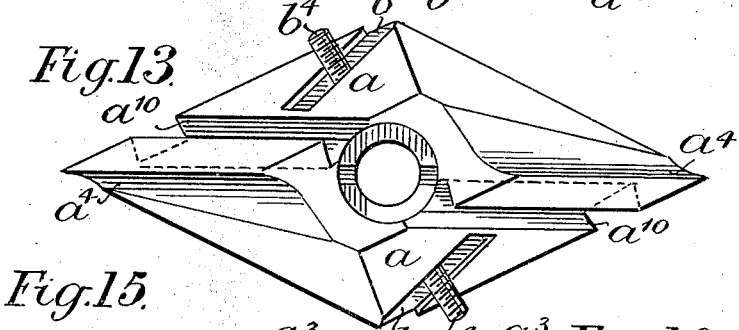
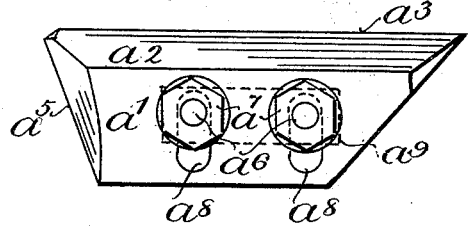
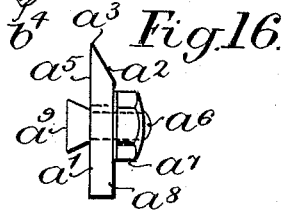
Witnesses:
Katherine E. Manning.
Jno. C. Adams.
Inventor:
Arthur James Norris,
By Knight Bros
Attys.
THE NORRIS PETERS CO., PHOTO-LITHO., WASHINGTON, D. C.

UNITED STATES PATENT OFFICE.

ARTHUR JAMES NORRIS, OF LONDON, ENGLAND.

ROTARY CUTTER.

SPECIFICATION forming part of Letters Patent No. 695,113, dated March 11, 1902.

Application filed November 11, 1901. Serial No. 81,859. (No model.)

*To all whom it may concern:*

Be it known that I, ARTHUR JAMES NORRIS, cabinet-maker, a subject of the King of Great Britain, residing at 63 Mildmay Grove, London, England, have invented a new or Improved Rotary Cutting or Shaping Tool Applicable for Working Wood or other Comparatively Soft Material, of which the following is a specification, reference being had to the drawings hereunto annexed and to the letters marked thereon.

The invention relates to a new or improved rotary cutting or shaping tool applicable for working wood or other comparatively soft material.

In the accompanying drawings, Figure 1 is an elevation of a tool constructed according to the present invention and formed with fixed cutters. Fig. 2 is a plan or top view thereof. Fig. 3 is a similar view to Fig. 1, but taken at right angles thereto. Fig. 4 is an under side view thereof. Fig. 5 is a perspective view of the stile of a door or like frame, illustrating the kind of work that the tool is adapted to perform. Fig. 6 is a similar view of a stile, but representing a shouldered recess of greater length than the diameter of the tool, two cuts of the tool being represented as having been made in the course of the construction of said recess. Fig. 7 is an elevation of a similar tool formed with removable cutters. Fig. 8 is a plan or top view thereof. Fig. 9 is an elevation of a similar tool formed with removable and adjustable cutters and showing the same mounted on the spindle of a machine. Fig. 10 is a plan or top view of the tool. Fig. 11 is a vertical section thereof, taken on the line 1 1 of Fig. 10. Fig. 12 is an elevation thereof, but with the cutters and some other parts removed. Fig. 13 is a plan or top view thereof. Fig. 14 is an elevation thereof, taken at right angles to Fig. 12. Fig. 15 is a rear view of one of the cutters separately. Fig. 16 is an end view thereof. Fig. 17 is a rear view of the device for adjusting the cutter, and Fig. 18 is an end view thereof.

In the several figures, in which like parts are indicated by similar letters of reference, Figs. 5 and 6 are drawn to a reduced scale with respect to the other figures of the drawings.

Referring to Figs. 1 to 6, $a$ represents the body of the tool, which is formed miter-shaped, and the periphery thereof is divided into two or it might be more radially-disposed teeth or cutters $a'$, ground with oblique or tangential facets $a^2$, so as to constitute cutting edges $a^3$, while upon its front side each tooth or cutter is preferably formed with a hollow $a^4$ to facilitate the clearance of the cuttings or shavings in the working of the tool. The tool is axially perforated, and on its under side it is provided with a stud $c$, the upper end of which is fixed in the perforation in such manner that no projection is thereby caused on the upper side of the tool, and the lower end of said stud is adapted to be fixed with the rotary spindle of a woodworking-machine, or other means might be employed for fixing the tool therewith.

In Fig. 5, $e$ represents the stile of a door or like frame, and $e'$ represents a "shouldered" or miter-like recess formed therein and adapted to receive the correspondingly-shaped ends $f'$ of the rails $f$, and one of the uses of the tool is to form said shouldered recesses, and for this purpose the wood is placed on edge and advanced to and passed over the tool while it is rapidly revolving, so that the tool cuts its way through the same. The tools may be of a diameter equal to the width of the shouldered recess $e'$, so as to form the same at one operation, or they may be of a diameter less than the width of said shouldered recess, and they may be made right and left handed, if desired, and driven in opposite directions, so as to leave a clean face to the wood. If the diameter of the two tools were together less than the width of the shouldered recess $e'$ to be formed, a V-shaped block of wood $e^2$ would, as shown at Fig. 6, remain to be subsequently cut away in order to complete the operation, and in order to accomplish this the wood is advanced one or more times with the part $e^2$ opposed to the tool, when the central portion will be cut away.

In order to quicken and render more perfect the action of the tool, the head thereof, as well as the periphery, is formed with cutting edges. These cutting edges are formed by grinding the ends of the peripheral cutters $a'$ at an angle to the axis of the tool and to a horizontal plane, so as to leave step-like cutting edges $a^5$ at the ends of the peripheral cutters.

In the example given at Figs. 7 and 8 the cutters $a'$ instead of being formed integral with the body $a$ of the tool, as in the previous figures, are formed separate therefrom and are removably and adjustably fixed therewith by means of threaded studs or bolts $a^6$, fixed to the body of the tool and passing through slots $a^8$ in the cutters, and nuts $a^7$, screwing onto the bolts $a^6$ and bearing upon the cutters $a'$. This arrangement possesses the advantage that the cutters $a'$ when blunt may be easily removed for the purpose of sharpening and sharp cutters readily fixed in their place without seriously interrupting the work of the machine.

In the example given at Figs. 9 to 18 the body $a$ of the tool is formed of miter shape, and it is axially perforated to receive the upper end of the stud $c$, which is fixed therewith by means of a nut $c'$, while the lower end of the stud $c$ is fixed with a driven shaft or spindle $d$. The body of the tool in plan is of diamond shape, although this might be varied, and possesses four prismatic or inclined facets, and the front facets, having regard to the direction of rotation of the tool, which is indicated by the arrow in Fig. 10, are formed with hollows $a^4$ for the purpose described with respect to Figs. 1 to 4, while the rear facets are flat or plane and are provided with open-ended dovetail grooves $a^{10}$, extending from the base to the apex of the body $a$, and therefore at an inclination to the axis of the tool. The cutters $a'$ in this example are provided with slots $a^8$, arranged transversely thereof and through which are passed threaded studs $a^6$, fixed to a dovetail connecting-bar or key $a^9$, shaped to fit the dovetail grooves $a^{10}$ of the body $a$ of the tool, and the studs are provided with coacting nuts $a^7$, adapted to screw down upon the rear side of the cutters $a'$, and said cutters are thus adapted to be adjusted either longitudinally with relation to the dovetail groove $a^{10}$, so as to project more or less from the apex of the body $a$ of the tool, or transversely of said groove, so as to project more or less beyond the periphery of said body, and thus fixed by screwing up the nuts $a^7$. In order to insure the correct lateral adjustment of the cutters $a'$, the following device is employed: In the body $a$ of the tool is formed at right angles to the groove $a^{10}$ a groove $b$, open at its outer end, and in connection with said groove is employed a device which may be called a "set-square" $b'$ and which is provided upon its inner face with a projection or key $b^5$, which closely fits the groove, but with capability of sliding therein, and upon its outer face with a knob or stud $b^2$, by the aid of which it may be manipulated, and the object of the device is to set the edge of the cutter to the required angle. In order to fix the set-square $b'$ in any position to which it may be adjusted, it is provided with a slot $b^3$ therein, through which passes a threaded stud $b^4$, fixed to the body of the tool at the bottom of the groove $b$ and furnished with a jam-nut $b^6$, which bears upon the outer face of the set-square $b'$. The set-square $b'$ bears against the rear edge of the cutter $a'$, as shown at Fig. 9, so that by slacking back the nuts $a^7$ and $b^6$ and manipulating the set-square by means of the knob $b^2$ the cutter $a'$ may be adjusted in the required manner, and by screwing up said nuts the cutter may thus be securely fixed.

The upper ends of the cutters $a'$, which project beyond the body $a$ of the tool, are ground off at an angle, and their extreme points are preferably ground off to form triangular facets, leaving cutting edges, or the upper ends of the cutters might be pointed and prolonged and set with their points coincident with the axis of the tool.

A tool of the character above described possesses the advantages that the cutters may be readily adjusted to compensate for wear by sharpening and dismounted for sharpening or repairs, while by the vertical and lateral adjustment the diameter of the tool may be to some extent varied to suit different requirements.

It will be understood that other means than the dovetail grooves and bars may be employed for fixing and adjusting the cutters in position, while other means than the set-square may be used to insure the truth of said adjustment, and it will also be understood that by modifying the shape of the body of the tool the number of the cutters employed may be varied—that is to say, although two is the preferred number one or more than two might be employed, but perhaps not with the same advantage; but in all cases the tool must be properly balanced.

Having now particularly described and ascertained the nature of the said invention and in what manner the same is to be performed, I declare that what I claim is—

1. A miter-shaped rotary cutting or shaping tool for wood or the like provided with teeth or cutters having their front or cutting edges formed or arranged longitudinally of and at an angle to the axis of the tool, said edges being ground at a tangent to an imaginary circle drawn around said axis and hollowed on their front side substantially as herein shown and described and for the purpose stated.

2. A miter-shaped rotary cutting or shaping tool for wood or the like provided with teeth or cutters having their front cutting edges formed in right lines and arranged longitudinally of and at an angle to the axis of the tool, said edges being ground at a tangent to an imaginary circle drawn around said axis and the upper ends of said teeth or cutters being ground at an angle to a horizontal plane so as to leave step-like cutting edges and the body of the tool being so constructed that no part thereof projects beyond the cutters, substantially as herein shown and described and for the purpose stated.

3. A miter-shaped rotary cutting or shaping tool for wood or the like provided with cutters removably fixed therewith and having their front or cutting edges formed in right lines and arranged longitudinally of and at an angle to the axis of the tool, said edges being ground at a tangent to an imaginary circle drawn around said axis and the upper ends of the cutters being ground at an angle to a horizontal plane so as to leave step-like cutting edges and the body of the tool being so constructed that no part thereof projects beyond the cutters substantially as herein shown and described and for the purpose stated.

4. A miter-shaped rotary cutting or shaping tool for wood or the like provided with cutters fixed therewith so as to be removable at will and with capability of longitudinal and transverse adjustment, said cutters having their cutting edges arranged longitudinally of and at an angle to the axis of the tool, said edges being ground at a tangent to an imaginary circle drawn around said axis, substantially as herein shown and described and for the purpose stated.

5. A miter-shaped rotary cutting or shaping tool for wood or the like comprising a pyramidal-shaped upwardly-tapering body presenting inclined planes or facets opposite ones of which are formed with longitudinal dovetail grooves disposed parallel to the inclined edge of the body, dovetail bars sliding in the grooves and provided with threaded studs, cutters provided with transverse slots adapted to receive the studs and nuts screwing onto the studs for clamping and fixing the dovetail bars and cutters in position, substantially as herein shown and described and for the purpose stated.

6. A miter-shaped rotary cutting or shaping tool for wood or the like comprising a pyramidal-shaped upwardly-tapering body presenting inclined planes or facets opposite ones of which are formed with longitudinal dovetail grooves disposed parallel to the inclined edge of the body, dovetail bars sliding in said grooves and provided with threaded studs, cutters provided with transverse slots adapted to receive the studs, nuts screwing onto the studs for clamping and fixing the dovetail bars and cutters in position, grooves at right angles to the dovetail grooves, a set-square having on its inner face a key or projection fitting said groove and means for fixing the set-square in position, substantially as herein shown and described and for the purpose stated.

ARTHUR JAMES NORRIS.

Witnesses:
C. MELBOURNE WHITE,
C. H. WHITE.